Patented Nov. 6, 1928.

1,690,632

UNITED STATES PATENT OFFICE.

HARRY LE B. GRAY AND CYRIL J. STAUD, OF ROCHESTER, NEW YORK, ASSIGNORS TO EASTMAN KODAK COMPANY, OF ROCHESTER, NEW YORK, A CORPORATION OF NEW YORK.

PROCESS OF MAKING CHLOROFORM-SOLUBLE CELLULOSE ACETATE.

No Drawing.   Application filed June 6, 1927. Serial No. 196,999.

This invention relates to processes of making chloroform-soluble cellulose acetate. One object of the invention is to provide a process for producing cellulose acetate of this kind in which there is used an amount of acetic anhydrid closely approaching the theoretical minimum. Another object is to provide a process in which solid or undissolved chloroform-soluble cellulose acetate is produced by using acetic anhydrid without depending upon diluents. A further object is to provide such a process having the maximum simplicity and economy, and in which there is used little or no excess of acetic anhydrid and there are no complicated recovery or manipulation steps. Still another object of the invention is to provide an inexpensive and readily controlled process which will produce cellulose acetate fully soluble in chloroform, free from harmful degradation, and capable of being hydrolyzed into acetone-soluble cellulose acetate suitable for manufacturing flexible, transparent films. Other objects will hereinafter appear.

Acetone-soluble cellulose acetate is manufactured in two stages. In the first stage chloroform-soluble cellulose acetate is prepared; in the second stage the latter is converted into the acetone-soluble form. Our process relates to the first stage.

The acetylation of cellulose in the first stage has usually been accomplished by treating it with acetic anhydrid and a catalyst mixed with either a solvent of cellulose acetate, such as glacial acetic acid, or a non-solvent, such as benzol. When acetic acid has been employed, a syrupy solution has been obtained at the end of the first stage; but when benzol has been used, the cellulose acetate was in fibrous form. In each case the acetic anhydrid was diluted and ordinarily a considerable excess of it was used in order to obtain a product sufficiently acetylated to become chloroform-soluble. In subsequent steps the excess of anhydrid was either lost by being converted into acetic acid by means of water or else recovered by a troublesome fractional distillation. Since acetic anhydrid was the costliest ingredient in the process, being worth several times the value of the acid into which it was converted, its loss or recovery was expensive.

To avoid the penalties of dilution, attempts have been made to acetylate cellulose by means of undiluted acetic anhydrid. Schützenberger ("Annales de Chimie et de Physique" 1870 vol. 21, pages 235 to 264, especially page 239) boiled cellulose in a large excess of acetic anhydrid at 180° C. until a solution was formed, from which cellulose acetate was obtained by precipitation in water. When he tried a lower temperature, 150° C., and only a slight excess (twice as much weight of anhydrid as of cellulose) the cellulose fibers did not dissolve but were partly changed into lower cellulose acetates which were insoluble in all of his solvents and could not be separated from unchanged cellulose.

Cross & Bevan ("Researches on Cellulose 1895–1900," pages 40 and 41 and "Researches on Cellulose 1900 to 1905," pages 11 and 12) heated cellulose with acetic anhydrid, and obtained either insoluble lower acetates, or higher acetates which dissolved in the excess of anhydrid.

Lederer (British Patent No. 11,164 of 1902, "Process of acetylizing cellulose") mixed cellulose with an excess of anhydrid and a catalyst. He thus obtained a homogeneous mass from which the cellulose acetate was precipitated by water.

Ost (Zeitschrift für Angewandte Chemie, 1906 vol. 19, pages 993 to 1000, especially page 998) acetylated cellulose under 30° C. in a large excess of acetic anhydrid and sulfuric acid, stopping the reaction before the cellulosic fibers dissolved. The cellulose acetate thus produced contained less than 40% of acetyl groups (under 55% combined acetic acid) and was incompletely soluble in pure chloroform, although it dissolved in an alcohol-chloroform mixture.

From these prior investigations it would be expected that chloroform-soluble cellulose acetate of suitable acetyl content (above 42% of acetyl) could be obtained with undiluted acetic anhydrid only when a large excess of the latter was used, the cellulose acetate dissolving in said excess and the latter being removed with water. It would further be expected that insufficiently acetylated fibers would be obtained if the amount of undiluted anhydrid were cut down to avoid solution of the fibers.

Contrary to such expectations we have found that undissolved cellulose acetate fibers, fully soluble in chloroform, can be prepared from undiluted acetic anhydrid, without any wasteful excess of the latter, by taking proper precautions. Broadly speaking, the cellulosic material must be thoroughly mixed with an unexcessive amount of anhydrid and the reaction carried out with such a small amount of catalyst and at such a low temperature that the acetylated cellulose will not be dissolved. By "undiluted" anhydrid we mean that the impurities in it do not exceed about 15%. While we can conveniently use commercial anhydrid of approximately 94% strength, or better, we have obtained useful results with a strength as low as 85%.

We prefer to use cellulosic material in the fibrous form, although our process can be used with other solid forms in which there is a large surface relative to the mass of material, such as cellulose powder. Since we avoid solution of the material during the reaction, the product resembles the starting material in form, for example, fibrous cellulose yields chloroform-soluble cellulose acetate fibers.

Any of the cellulosic materials which have proven useful heretofore in making cellulose acetate may be employed. Examples are, cleaned and bleached cotton fibers, tissue paper prepared from cotton especially for acetylation, surgical cotton wool, filtration cotton, cotton linters, and even wood pulp, such as bleached sulfite pulp. Moreover, we can employ cellulosic materials which have been already partially acetylated, such, for example, as those described in the following applications of H. T. Clarke and C. J. Malm, Serial No. 122,028, filed July 12th, 1926 for cellulose esters of fatty acids and processes of making the same, Serial No. 160,765 filed January 12th, 1927 for process of esterifying hydrated cellulose with lower fatty acids, and Serial No. 186,170, filed April 23rd, 1927 for process of esterifying mercerized cellulose with lower fatty acids. The first of these applications describes stable substantially unhydrolized cellulose acetates having the appearance of cellulose and containing about 4% to 6.5% by weight of acetyl. The second describes acetates of hydrated cellulose, containing about 6% to over 20% of acetyl and appearing like the rayon fibers from which they may be conveniently prepared. The third describes acetates of mercerized cellulose, containing about 8% to over 20% of acetyl and yet superficially indistinguishable from the original mercerized fibers. When the fibers have already been partly acetylated (say, for instance, to contain from 4% to 30% of acetyl) without using acetic anhydrid, our process will complete the acetylation to chloroform-solubility with the maximum economy in anhydrid. The only acetic anhydrid then needed in the entire production of the cellulose acetate is the little employed in raising the acetyl percentage to get chloroform solubility. Mercerized and dehydrated fibers, as described in the application of H. T. Clarke and C. J. Malm, Serial No. 186,169, filed April 23rd, 1927 for processes of making organic esters for cellulose also are useful raw material for our process. The dehydration is performed by the aid of a substantially anhydrous neutral organic liquid, such as benzol, for instance.

The moisture in the cellulosic material in our process should not be above that naturally present under ordinary atmospheric conditions, and may be made much less by preliminary drying. From 0% to 4% of moisture by weight in the cellulose is a safe preferred working range.

The proportions with which we operate can best be understood by comparison with the theoretical. According to the latter, 162 parts by weight (1 mol.) of cellulose react with 306 parts (3 mols.) of acetic anhydrid to yield 288 parts (1 mol.) of cellulose "triacetate" and 180 parts (3 mols.) of acetic acid. It is more conveniently expressed by saying that 100 parts by weight of cellulose react with 189 parts of anhydrid. We use less than 250 parts of pure anhydrid per 100 parts of cellulose. In operating on partially acetylated cellulose, we reduce the relative proportions of anhydrid to fiber still further in accordance with the extent of the preacetylation. When using commercial acetic anhydrid containing impurities, of course, allowance has to be made for the percentage of actual acetic anhydrid in it.

Most of the catalysts heretofore used in acetylation of cellulose can be employed in our process, such, for example, as sulfuric acid, zinc chlorid, magnesium perchlorate, etc. We have found that a mixture of sulfuric acid and phosphoric acid (preferably ortho) in equal parts by weight is especially useful. Where sulfuric acid is present, as in this mixture, it is desirable to keep the proportion of catalyst down to the smallest amount that is practical. It should not be enough to cause a rise in temperature which will cause solution of the product. This is readily determined by a small test. For example, we have operated successfully with said sulfuric and phosphoric acid mixture when the amount of it was as small as one-thousandth of the weight of the anhydrid. Too much sulfuric acid seriously degrades the product and causes the cellulose fibers to dissolve or clump together into a difficultly manipulatable mass.

It is important in our process to coordinate the temperature of the reaction with the strength of the catalyst and the quantity of anhydrid used. The stronger the catalyst or the greater the proportion of it which is used, the lower should be the temperature. The greater the quantity of anhydrid the less the temperature of the reaction; but since our proportion of it closely approaches the theoretical minimum and thus varies over a comparatively narrow range, changes in such proportion within this range do not alter the working temperature very much. The principal factor in selecting the temperature is the catalyst. In general, the temperature of the reacting ingredients is kept so low that the cellulose acetate which is formed does not go into solution nor stick together in troublesome clumps. This can readily be determined by test for any particular kind and proportion of catalyst. Since catalysts exist which will induce full acetylation even at room temperature and yet will not induce solution of the cellulose acetate at such temperature, we prefer, for simplicity, to work at or close to that temperature. With strong catalysts, such as said sulfuric-phosphoric acid mixture in the proportions noted above, we conduct the reaction, for example, below 30° C.

Our chloroform-soluble cellulose acetate fibers or particles are also soluble in glacial acetic acid, but it is highly important to note that the glacial acetic acid formed during our process by the acetylating reaction is insufficient under the temperature and catalytic conditions outlined above to dissolve said fibers or particles or even to clump them together to an unmanageable extent.

We shall now give several examples of our invention; but it will be understood that the latter is not limited to such details except as indicated in the appended claims.

We thoroughly mix the cellulose with the acetylating bath. This mixing is best effected by immersing and agitating the fibers in an excess of the bath and then pressing out all of the bath that is not needed for the acetylation. For instance, 100 parts by weight of filter cotton are agitated for about five minutes in a bath of 1400 parts by weight of acetic anhydrid, (94% strength) and 0.9 parts of sulphuric acid (98% strength) and 0.9 parts of phosphoric acid (85% strength). This is then pressed until the cellulose and adherent liquid amount to 320 parts, corresponding to about 100 parts of cellulose, 220 parts of such anhydrid, and the retained catalyst, approximately .257. At this time the mixture has the appearance of the original cellulose slightly moist with acetic anhydrid. Upon shaking the mixture, the fibers move practically as freely as untreated cotton would do. It is left in a closed vessel at room temperature until finished.

A convenient way of telling when the reaction is completed is to take test samples at intervals until a specimen fully dissolves in pure chloroform. Another way is to examine small test specimens at intervals by polarized light using a microscope arranged with crossed Nicol prisms and a selenite plate so located as to give the most brilliant red field. The untreated fibers appear brilliant yellow against the red background. Completely acetylated fibers change definitely to a deep red or a deep blue depending upon the position of the fiber relative to the plane of polarization of the light. This characteristic change indicates a practically complete acetylation of the fiber, above 42% of acetyl in the ester. This method of examination enables the progress of the reaction to be studied, because the extent of the reaction in each fiber can be plainly seen. The time of the complete reaction varies widely, but even as prolonged a period as 336 hours at room temperature gives an undegraded product. Good products can, however, be obtained in much less time.

In another example of our invention 100 parts by weight are taken of partially acetylated fibers containing about 8% of acetyl prepared by mercerizing and prolonged boiling in acetic acid as described in said application No. 186,170. Such fibers are immersed in 1400 parts by weight of acetic anhydrid (94% strength) containing only a minute amount of mixed sulfuric and phosphoric acids, say .4 parts by weight of each. After thorough agitation, say for about five minutes, the mixture is pressed to 265 parts, of which 100 parts are the fibers and 165 parts are such anhydrid with traces of catalyst. With such partially acetylated fibers the catalyst should be lower in amount than with plain cellulose to avoid too violent reaction. The pressed off reaction mass is kept in a closed vessel at atmospheric pressure and room temperature until the desired degree of acetylation is reached, as shown by the above described tests. If the reaction proceeds too rapidly with consequent rise in temperature, the mixture may be cooled, even below room temperature.

The undissolved first-stage cellulose acetate produced by our process can be hydrolized to acetone solubility by any of the known processes for hydrolizing chloroform-soluble cellulose acetate fibers or powders. The films made from such acetone-soluble derivatives show good flexibility and the dopes from which they are prepared show good viscosity, indicating that our process does not materially degrade the cellulose.

Having thus described our invention, what we claim as new and desire to secure by Letters Patent is:

1. In the process of manufacturing cellulose acetate the steps of thoroughly mixing 100 parts by weight of esterifiable cellulosic material with an esterifying catalyst and less than 250 parts of liquid acetic anhydrid of which there is at least the theoretical quantity for fully esterifying said material, said anhydrid containing less than 15% of solvent diluent, and the temperature of the reaction being below the solution point of cellulose acetate in said mixture, the reaction being continued until said material is fully converted into chloroform-soluble cellulose acetate in the undissolved state.

2. In the process of manufacturing cellulose acetate the steps of thoroughly mixing 100 parts by weight of esterifiable cellulosic material with a catalyst having a strength of the order of 0.257 parts by weight of an equimixture of sulfuric and phosphoric acids, and with less than 250 parts of liquid acetic anhydrid but at least the theoretical quantity to fully esterify said material, said anhydrid being of at least 85% strength but otherwise undiluted, and conducting the reaction at room temperature until said material is fully converted into chloroform-soluble cellulose acetate in the undissolved state.

3. In the process of manufacturing cellulose acetate the steps of thoroughly mixing 100 parts by weight of fibrous cellulosic material capable of being acetylated to contain over 42% of acetyl groups, with at least the theoretically sufficient liquid acetic anhydrid for such acetylation but less than 250 parts thereof, said anhydrid being of at least 85% strength, being otherwise undiluted, and containing a catalyst having the strength of an equimixture of sulfuric and phosphoric acids, equal to a thousandth of the weight of the anhydrid, the reaction being conducted below 30° C. until said material is fully converted into cellulose acetate fibers containing over 42% of acetyl groups.

4. In the process of manufacturing cellulose acetate, the steps of agitating esterifiable cellulosic material with an excess of liquid acetic anhydrid containing an esterifying catalyst until said material is thoroughly impregnated therewith, pressing off liquid from the mixture until the acetic anhydrid left in 100 parts by weight of said material is less than 250 parts but at least sufficient to fully esterify said material, and maintaining the ingredients at a temperature below which the cellulose would dissolve until said material is fully converted into chloroform-soluble cellulose acetate in the undissolved state.

Signed at Rochester New York this 1st day of June, 1927.

HARRY LE B. GRAY.
CYRIL J. STAUD.